United States Patent
Vronay

(10) Patent No.: US 7,230,531 B2
(45) Date of Patent: Jun. 12, 2007

(54) IMPRINTABLE ANCILLARY SIGNAL INDICATOR FOR INDICATING A COMMUNICATION

(75) Inventor: David Patrick Vronay, Beijing (CN)

(73) Assignee: Microsoft Corporation, Redmond, WA (US)

( * ) Notice: Subject to any disclaimer, the term of this patent is extended or adjusted under 35 U.S.C. 154(b) by 175 days.

(21) Appl. No.: 11/010,609

(22) Filed: Dec. 13, 2004

(65) Prior Publication Data

US 2006/0125628 A1    Jun. 15, 2006

(51) Int. Cl.
*G08B 1/08* (2006.01)
(52) U.S. Cl. .................. 340/539.2; 455/415; 455/567; 379/142.04; 379/142.06; 340/572.1; 340/7.47; 340/573.1
(58) Field of Classification Search ..................... None
See application file for complete search history.

(56) References Cited

U.S. PATENT DOCUMENTS

| | | | | |
|---|---|---|---|---|
| 4,412,217 A * | 10/1983 | Willard et al. | ............. | 340/7.52 |
| 5,848,362 A * | 12/1998 | Yamashita | .................. | 455/567 |
| 6,188,916 B1 * | 2/2001 | Noda et al. | ................. | 455/567 |
| 6,477,117 B1 * | 11/2002 | Narayanaswami et al. | .. | 368/251 |
| 6,813,344 B1 * | 11/2004 | Lemke | .................. | 379/142.06 |
| 6,868,498 B1 * | 3/2005 | Katsikas | ....................... | 726/14 |
| 6,978,118 B2 * | 12/2005 | Vesikivi et al. | ............ | 455/41.1 |

* cited by examiner

*Primary Examiner*—Benjamin C. Lee
(74) *Attorney, Agent, or Firm*—Merchant & Gould P.C.

(57) ABSTRACT

An ancillary signal indicator notifies the reception of a signal that is associated with a user. The ancillary signal indicator includes an imprint actuator configured to instigate a signal imprint mode. A receiver is configured to receive an imprint signal when in the signal imprint mode and a memory is configured to store an imprint signal. The ancillary signal indicator also includes a signal notifier configured to actuate when a received signal corresponds to the imprint signal.

22 Claims, 9 Drawing Sheets

IMPRINTABLE ANCILLARY SIGNAL INDICATOR FOR INDICATING A COMMUNICATION

BACKGROUND OF THE INVENTION

Cellular telephones, personal computers, mobile computers and other computing devices are fast becoming mainstream modes for personal communication. These devices are also fast becoming mainstream communication devices for young adults and teenagers thereby making young adults and teenagers a large target for companies that produce communication devices. Many of these users implement social and status aspects into their computing devices. Current applications such as picture sharing, systems management server (SMS) accounts, email accounts and voice messaging reflect this behavior. Furthermore, similar to clothing, tattoos, body piercing or a new haircut, individuals have a strong desire to personalize their computing devices to indicate a sense of social belonging or a sense of individualism. This desire is evident through cellular phone covers, screen savers, personalized ringers and phone decals.

Another way individuals personalize their communication experiences is through "cellular jewelry". Cellular jewelry is an inexpensive, decorative device that may be attached to a cellular device.

SUMMARY OF THE INVENTION

Aspects of the present invention relate to a computer-implemented method for actuating an ancillary signal indicator upon reception of a signal. The method includes imprinting the ancillary signal indicator with an imprint signal; transmitting an actuation signal to the ancillary signal indicator; and actuating the ancillary signal indicator when the actuation signal corresponds to the imprinting signal.

Other aspects of the present invention include an ancillary signal indicator for providing a notification of the reception of a signal. The ancillary signal indicator includes an imprint actuator configured to instigate a signal imprint mode; a receiver configured to receive an imprint signal when in the signal imprint mode; a memory configured to store an imprint signal; and a signal notifier configured to actuate when a received signal corresponds to the imprint signal.

Another aspect of the present invention includes a communication system for providing a notification of the reception of a signal. The system may include a first communication device configured to receive a signal from a second communication device and transmit an identification signal that identifies the user associated with second communication device. The system may also include an ancillary signal indicator configured to receive the identification signal and actuate a notifier if the identification signal corresponds to an imprinted signal in a memory of the ancillary signal indicator.

These and other aspects will be appreciated in light of the disclosure herein.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Embodiments of an Imprintable Ancillary Signal Indicator

Social groups and status are very important to many young adults and teens. This is evident through the behavior of many young adults. For example, many teenagers may keep a diary having a list of friends. Other teenagers may exchange a ring, necklace or a piece of clothing to indicate that they are dating or in a relationship with another individual. Other teenagers may wear a pin, a type of clothing or a certain hairstyle to indicate that they are part of a particular group. These social and status aspects are very important to young adults.

Embodiments of the imprintable ancillary indicator include imprintable cellular jewelry that facilitates social aspects between two individuals. As one general example of one embodiment of the present invention, a first individual having a first cellular telephone may imprint an imprintable cellular jewelry device with an identifier of the first cellular telephone. This identifier may be unique to the first cellular telephone. Once the imprintable cellular jewelry has been imprinted, the first individual may give the imprinted cellular jewelry to a second individual having a second cellular telephone. When the first individual calls the second individual, the second cellular telephone sends out a signal associated with the identifier of the first cellular telephone. When the imprinted cellular jewelry is within range of the second cellular telephone, the jewelry actuates to indicate that the first cellular telephone is calling the second cellular telephone. Such an exemplary embodiment helps facilitate some of the social aspects of imprintable cellular jewelry as will be more fully set forth below.

Figure 3:
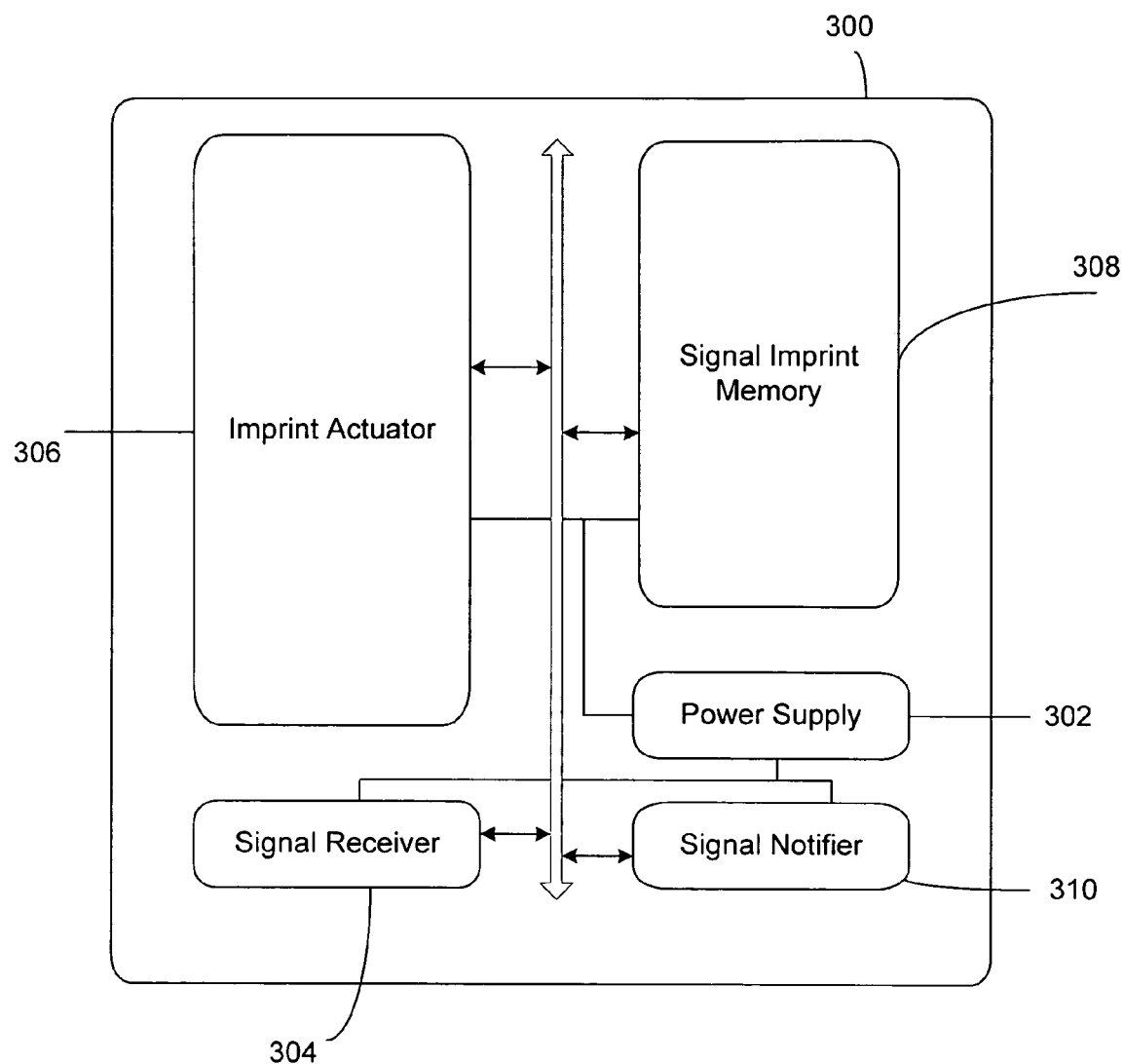
FIG. 3 illustrates an exemplary ancillary signal indicator that may be used in one exemplary embodiment of the present invention.

FIG. 3 illustrates an exemplary ancillary signal indicator in accordance with one embodiment of the present invention. Even though depicted as a block figure, ancillary signal indicator 300 may be shaped and sized in any manner. In one embodiment of the present invention, ancillary signal indicator 300 is shaped and sized like a charm, jewel, jewelry, amulet, ornament, capsule, watch, animal, letter, number, writing instrument, bracelet, necklace, ring or other design that may be appealing to a user. Ancillary signal indicator 300 may be further sized and shaped to allow attachment to a user, clothing, a cellular phone, a computer or clothing accessories.

Ancillary signal indicator 300 includes power supply 302 which may be implemented as one or more batteries, a solar cell, a kinetic generator, a spring drive, or any other power supply that is sufficient to actuate the ancillary signal indicator. It is contemplated, however, that power supply 302 may include an external power source such as an AC adaptor.

Ancillary signal indicator 300 includes signal receiver 304, which performs the function of receiving communications such as radio frequency communications. Signal receiver 304 may further include an antenna. Other signal reception is contemplated, however, as long as signal receiver 304 facilitates the reception of a signal from another communication device. For example, the signal receiver may facilitate audio, infrared or optical reception and the like.

Imprint actuator 306 instigates a signal imprint mode. Imprint actuator 306 may be a switch, trigger, breaker, mechanical actuator, electrical actuator, magnetic actuator or any other device for prompting ancillary signal indicator 300 into a signal imprint mode. In one embodiment, imprint actuator 306 is a mechanical breaker that a user engages to prompt a signal imprint mode. In another embodiment, an electrical, magnetic or radio signal instigates the signal imprint mode. In still another embodiment, imprint actuator 306 facilitates a one-time occurrence of the signal imprint mode. Stated another way, once ancillary signal indicator 300 is imprinted, it cannot be imprinted again or overwritten with another signal. Such an embodiment helps facilitate the social aspects of the present invention. It is further contemplated that ancillary signal indicator 300 is preconfigured in a signal imprint mode or that ancillary signal indicator 300 is preconfigured with a signal stored in the memory 308.

Signal imprint memory 308 may be any type of memory or storage. The signal imprint memory includes sufficient capacity to allow ancillary signal indicator 300 to imprint a particular signal type and then recognize the same signal type after signal imprint memory 308 has been imprinted.

Signal notifier 310 indicates when signal receiver 304 receives the same signal type as is imprinted in memory 308. The signal notifier may include a luminary, an audio device, a vibratory device, a mechanical device or any other signal or sensory device that is capable of indicating to a user that a matching signal was received by ancillary signal indicator 300.

Figure 4:
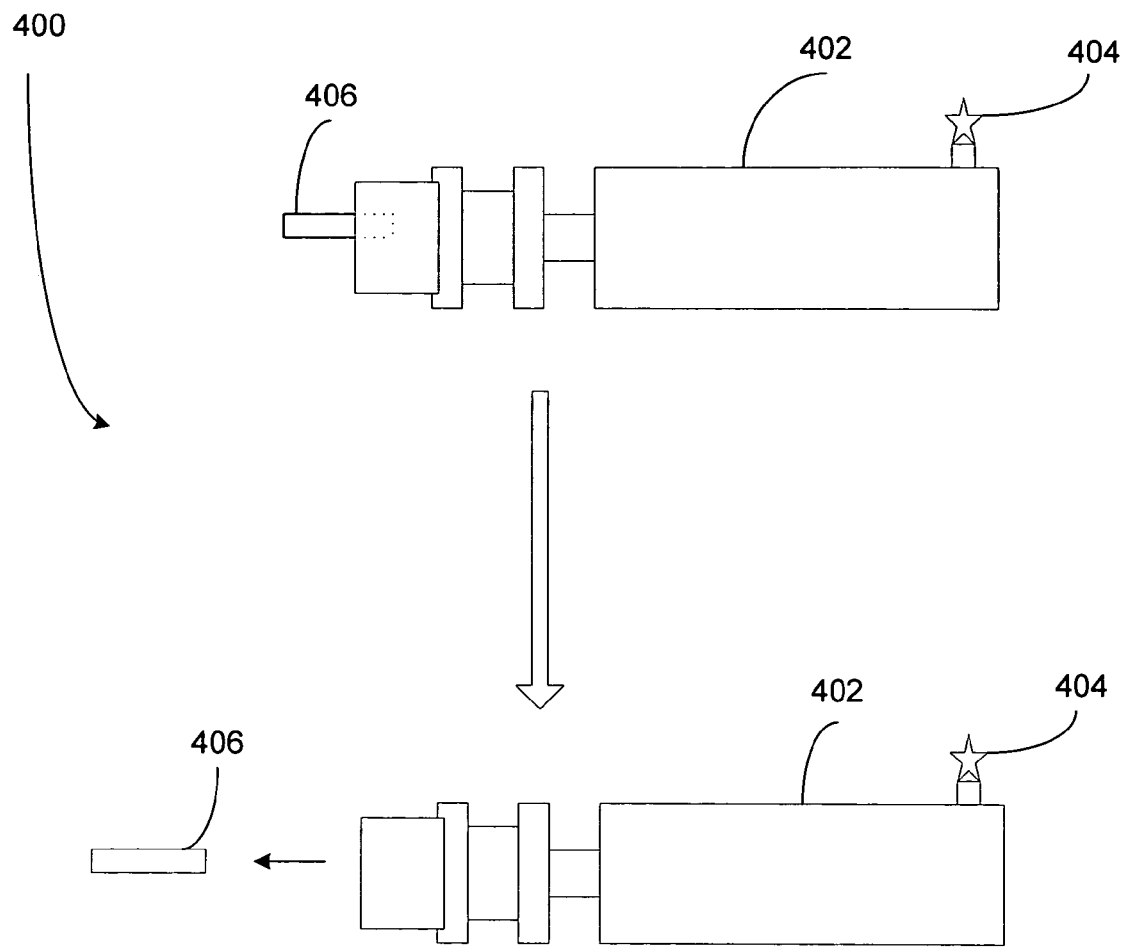
FIG. 4 illustrates a generalized side perspective of an exemplary ancillary signal indicator that may be used in one exemplary embodiment of the present invention.

FIG. 4 illustrates one embodiment of ancillary signal indicator 400 and one embodiment of imprint actuator 406. Reference number 402 is the housing of indicator 400. Again, housing 402 may take any size, shape or form as previously stated. Reference number 404 indicates the signal notifier and one embodiment of the imprint actuator is indicated by reference number 406. Reference number 406 is a mechanical breaker-type imprint actuator. As is depicted in FIG. 4, a user may "break" or remove a tab to instigate an imprint mode.

Figure 5:
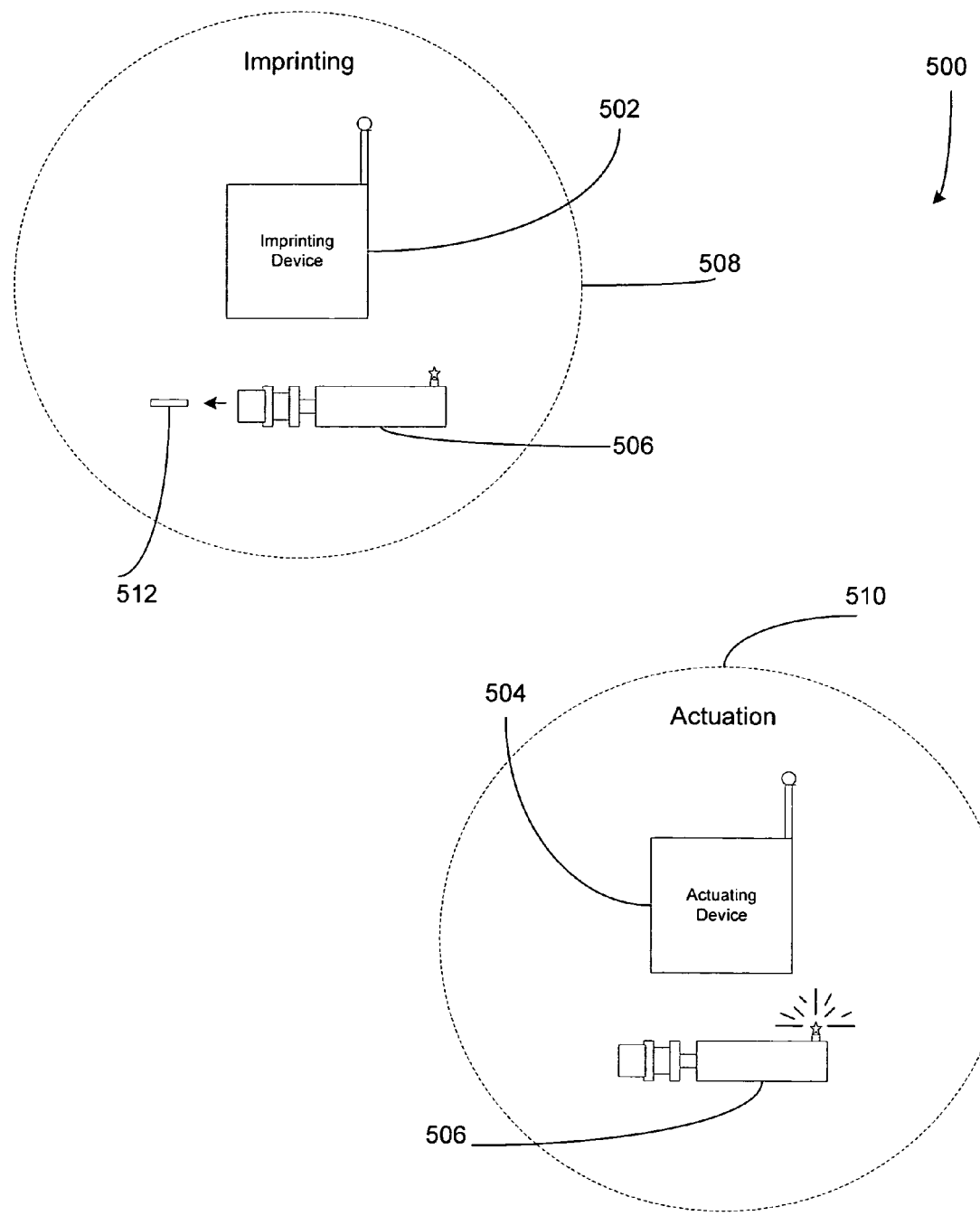
FIG. 5 illustrates a logical flow diagram of one process of the present invention.

FIG. 5 illustrates a general overview of one exemplary system 500 for implement the present invention. The system 500 includes imprinting device 502 and actuating device 504. Imprinting device 502 and actuating device 504 may include the computing device 100 exemplified in conjunction with FIG. 1 and/or the mobile computing device 200 exemplified in conjunction with FIG. 2. Devices 502 and 504 may include any device or portion of a device that is capable of transmitting a signal. Reference number 506 indicates an ancillary signal indicator as exemplified in conjunction with FIGS. 3 and 4. Reference number 508 is the signal broadcast range of imprinting device 502 and reference number 510 is the signal broadcast range of actuation device 504.

As is more fully described below in conjunction with FIGS. 6–9, imprinting device 502 broadcasts a signal that is encoded to include an identifier to ancillary signal indicator 506. According to one embodiment, the identifier is associated with at least one user. For example, in the situation where imprinting device 502 is a cellular phone, the signal may correlate to the telephone number of the cellular phone. The signal may also correlate to other identifiers. For example, the identifier may correspond to an email address or an SMS address that is associated with a user of the device. As another example, in the situation where imprinting device 502 is a computer, the signal may correlate to an email address, a network identifier or a web telephone number. In one exemplary embodiment, the identifier is a unique identifier that is only associated with the imprinting device. In another exemplary embodiment, the imprinting device may be the only device capable of imprinting the ancillary signal indicator with the identifier of the imprinting device. During the broadcast, ancillary device 506 is brought within broadcast range 508. Once the ancillary signal indicator is within broadcast range 508 of the imprinting device, imprint actuator 512 may then be actuated to instigate a signal imprint mode. In the situation where imprinting device 502 is a cellular phone, ancillary signal indicator 506 receives the identifier encoded within the signal and imprints the identifier that correlates to the telephone number of the cellular phone. Again, in the situation where the imprint actuator is pre-activated or the ancillary signal indicator is pre-imprinted, this step is not necessary. Although the imprinting device is shown as a wireless broadcast device, imprinting device 502 may be wired to signal indicator 506.

Once ancillary signal indicator 506 is imprinted a user may give away the ancillary signal indicator 506 to another individual who has a communication device such as the actuating device 504. In one exemplary embodiment of the present invention, other individuals will not be able to overwrite the imprinted signal so as to permanently correlate ancillary signal indicator 506 with imprinting device 502. This helps to facilitate the unique social and status qualities ancillary signal indicator 506. A user may give the uniquely imprinted ancillary signal indicator to a friend, family, a club member, significant other, group member, or social acquaintance so that the ancillary signal indicator is "tied" to the user's communication device.

When the user of imprinting device 502 calls the user of the actuating device, the caller ID of actuating device 504 identifies the telephone number of the incoming call. Actuating device 504 then transmits a signal that correlates to the telephone number. This signal may correspond to the same signal used to imprint ancillary signal indicator 506. When ancillary signal indicator 506 is within range of actuating device 504, ancillary signal indicator 506 receives the signal. If the received signal matches the imprinted signal, the signal notifier is activated and the user of the actuating device is notified that the user of imprinting device 502 is calling. Such notification may include an illuminary or audio indication as more fully stated above.

System 500 may be implemented in various ways apart for a cellular phone and a phone number. For example, system 500 may include a computer, a web phone, a standard phone, a videophone, a wireless router or a satellite phone. System 500 may also include a phone number, cellular number, a web address, an SMS address or an email address. The above examples are for exemplary purposes only. Other system configurations may be configured in light of the description set forth herein.

Figure 6:
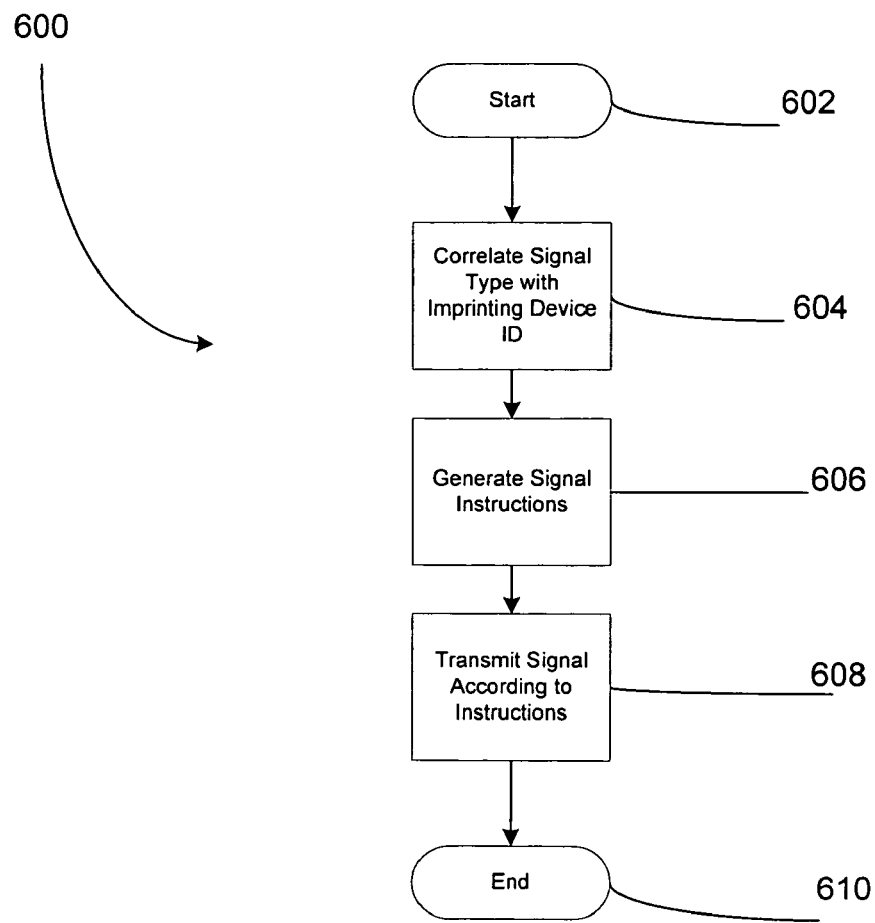
FIG. 6 illustrates a logical flow diagram of one process of the present invention.

FIG. 6 represents a logical flow diagram of one embodiment of transmitting a signal to imprint. Process 600 starts at starting block 602 and continues to block 604 where a signal is correlated with an identifier. For example, if the imprinting device is a telephone then the identifier could be the telephone number of the imprinting device. Likewise, if the imprinting device is a computer, the identifier could be the email address of the user. Other identifiers and imprinting devices may be used as more discussed above.

In one embodiment of the present invention the signal correlates to the characters of the identifier. In other words, the characters of the identifier act as a key to the signal frequency. For example, in that a telephone number is unique, a frequency of a signal may correlate to the telephone numbers. In this manner, each telephone number will produce a unique signal frequency. If the identifier contains letters or symbols, the frequency may correlate to the combination of letters and/or symbols. In another embodiment, correlation may occur though a preexisting signal. A tag may be imposed on the preexisting signal, which identifies the imprinting device. Such a tag may include a radio frequency identification tag. In yet another embodiment, correlation may be manually imposed. For example, a user could manually correlate a unique signal frequency or tag. Such correlation may relate to an email address, a phone number, a network identification and the like. In yet another embodiment, a phone number of the imprinting device may be used as the identifier.

Block 606 indicates the step of generating signal instructions. These instructions may include instructions to generate a signal at a particular frequency, attach a tag to an existing signal or to send an identifier with a signal. Block 608 indicates the step of transmitting a signal according to the instructions. The process then continues to end block 610.

Figure 7:
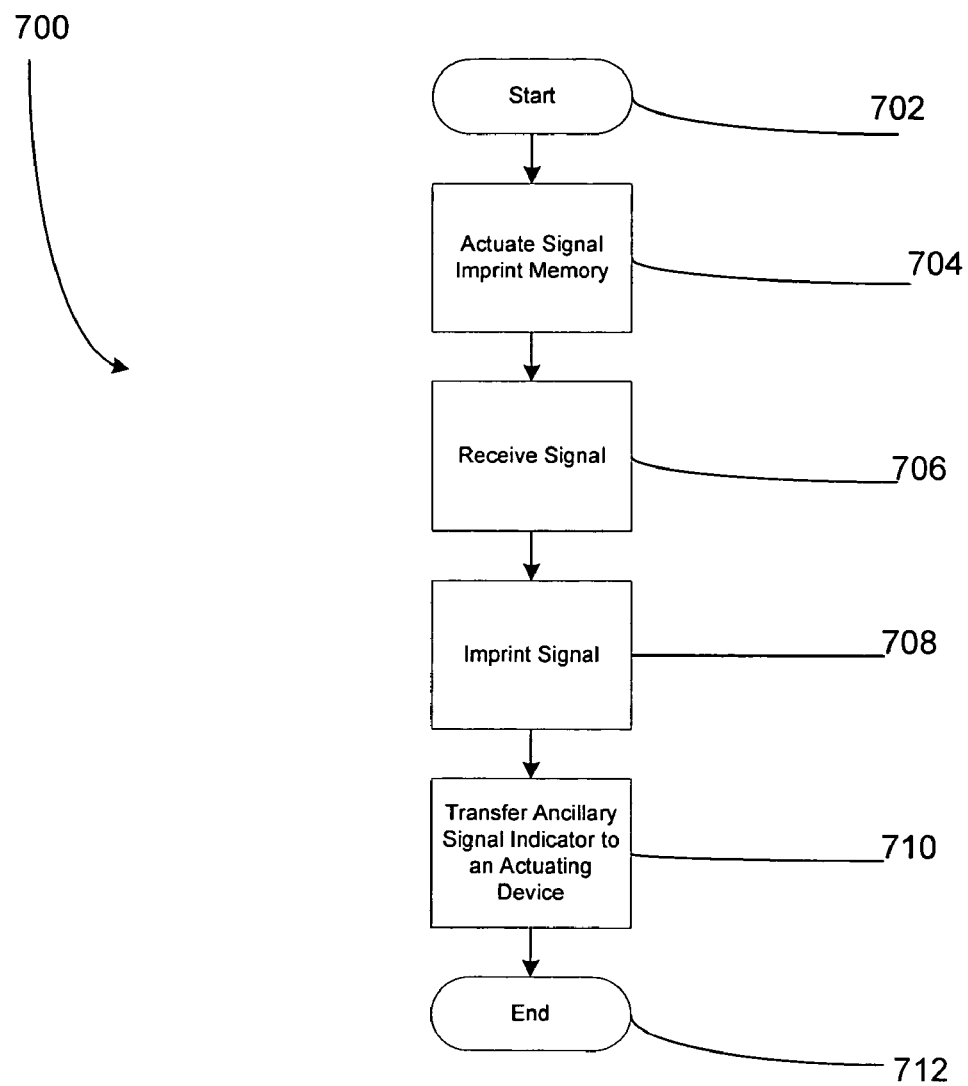
FIG. 7 illustrates a logical flow diagram of one process of the present invention.

FIG. 7 represents a logical flow diagram of one embodiment of imprinting an ancillary signal indicator. The process starts at starting block 702 and continues to block 704 where the imprint memory is activated. The activation process occurs as more fully set forth above. Once the activation takes place, the signal imprint memory is ready to receive a signal. At block 706, the ancillary signal indicator receives a signal and the signal is imprinted or stored as indicated by block 708. In at least one embodiment, this imprinting is permanent and the signal cannot be overwritten. At this point, the ancillary signal indicator is imprinted with a signal that is associated with at least one user. At block 710, the ancillary signal indicator may be given to friends, family, traded with school mates and the like. The process 700 ends at end block 712.

Figure 8:
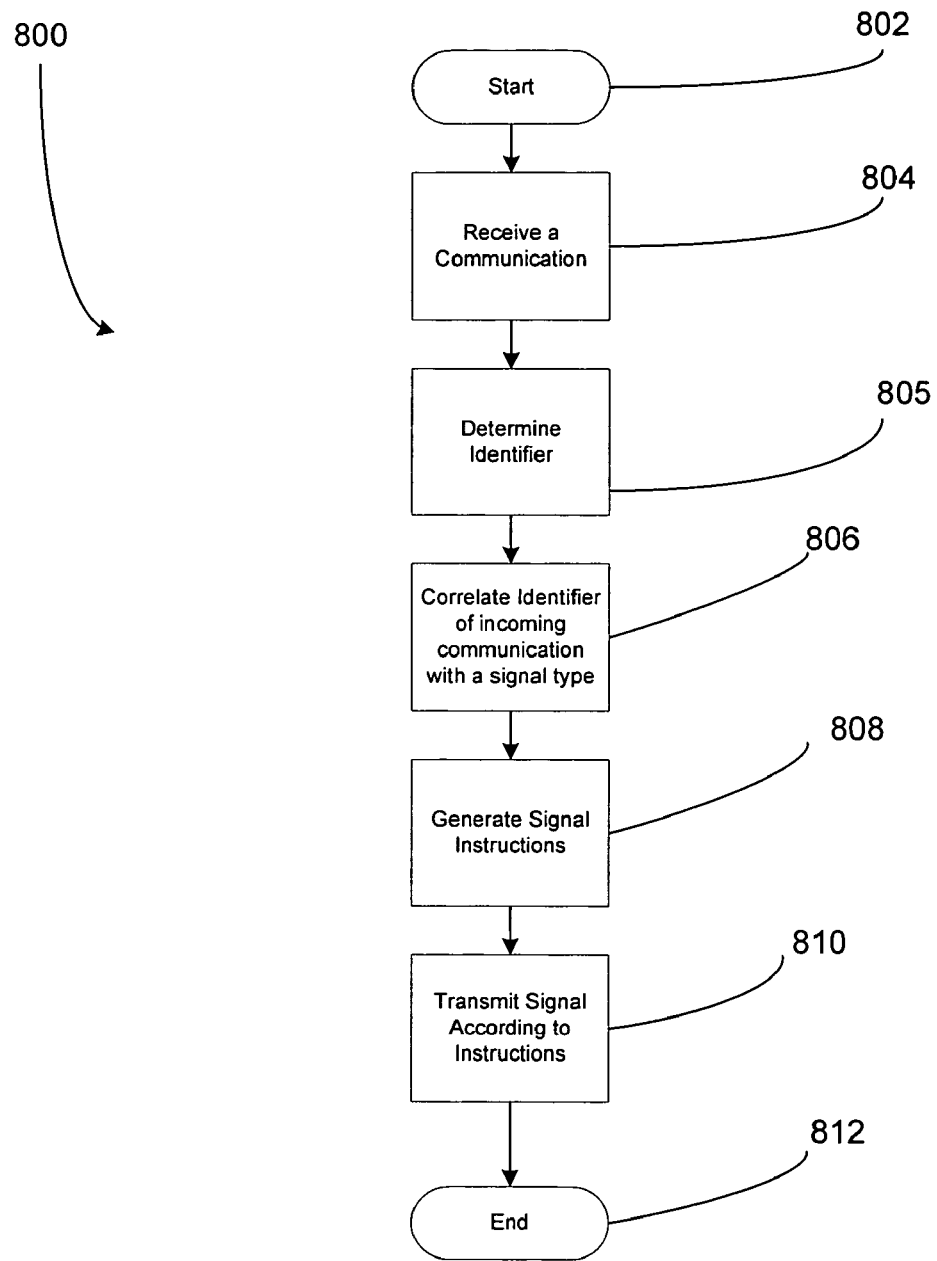
FIG. 8 illustrates a logical flow diagram of one process of the present invention.

FIG. 8 represents a logical flow diagram of one embodiment of transmitting an actuating signal. The process starts at starting block 802 and continues to block 804 where a communication is received. At block 805, an identifier associated with the communication is determined. The identifier is similar to the identifier described above in conjunction with FIG. 6. Block 806 indicates the step of correlating the received identifier of the incoming communication with a signal type. Again, this process will correspond to the process set forth in conjunction with FIG. 6. Block 808 indicates the step of generating signal instructions. These instructions may include instructions to generate a signal at a particular frequency, attach a tag to an existing signal or to send an identifier with a signal. Block 810 indicates the step of transmitting a signal according to the instructions. The process then continues to end block 812.

Figure 9:
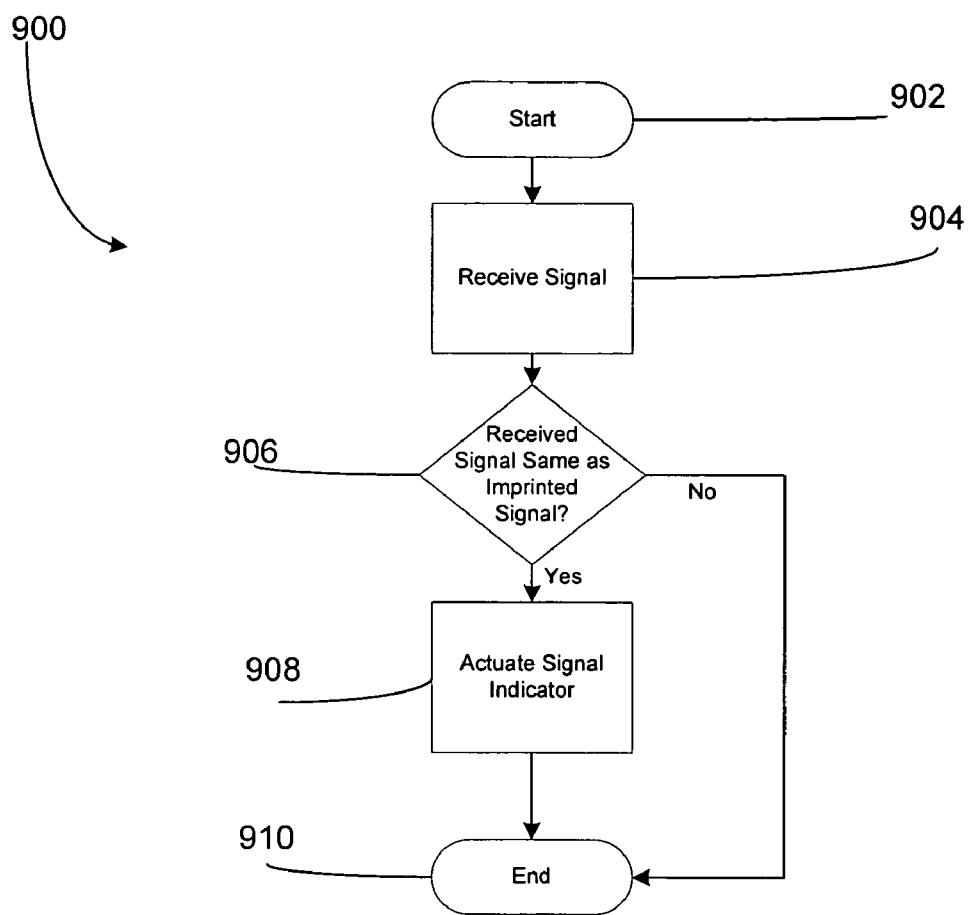
FIG. 9 illustrates a logical flow diagram of one process of the present invention.

FIG. 9 represents a logical flow diagram of one embodiment of actuating an ancillary signal indicator. The process starts at starting block 902 and continues to block 904 where a communication is received having a unique signal type. At block 906 the ancillary signal indicator compares the received signal to the signal that was imprinted on the ancillary signal indicator. If the signals do not represent the same identifier, the process continues to block 910 where the process ends. If the signals are the same, the process continues to block 908 where a signal notifier is actuated to notify a user that a communication is being received from a particular user. When the signal is no longer received the process continues to block 910 where the process ends. As is described in conjunction with FIGS. 6–9, the signal transmitters may have the same protocol for coding and uncoding the device IDs so that they may function in a lock-and-key fashion. Furthermore, the imprint signal and the actuating signal may be the same signal in order to actuate the ancillary signal indicator.

Illustrative Operating Environment

Figure 1:
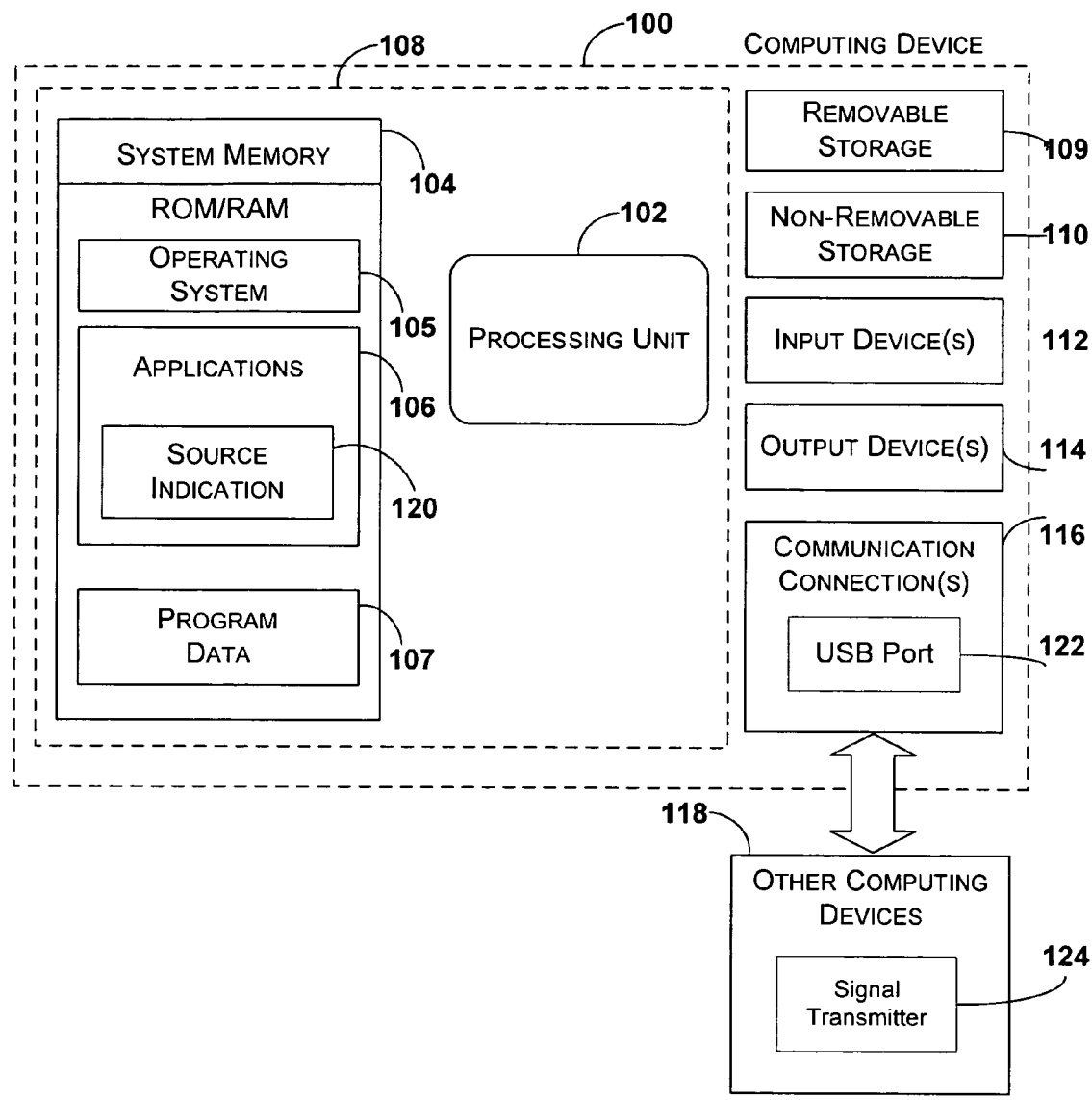
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, internet telephone, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include an application 120 for identifying the source of a communication and creating a signal instruction that correlates to a unique identifier of a communication source as is further discussed above in conjunction with FIGS. 3–9. Communications connection(s) 116 may also include a universal serial bus (USB) port 122. The other computing devices 118 may include a signal transmitter 124 for connection to the USB port 122 and transmission of a signal in accordance with the signal instruction created by the application 120.

Figure 2:
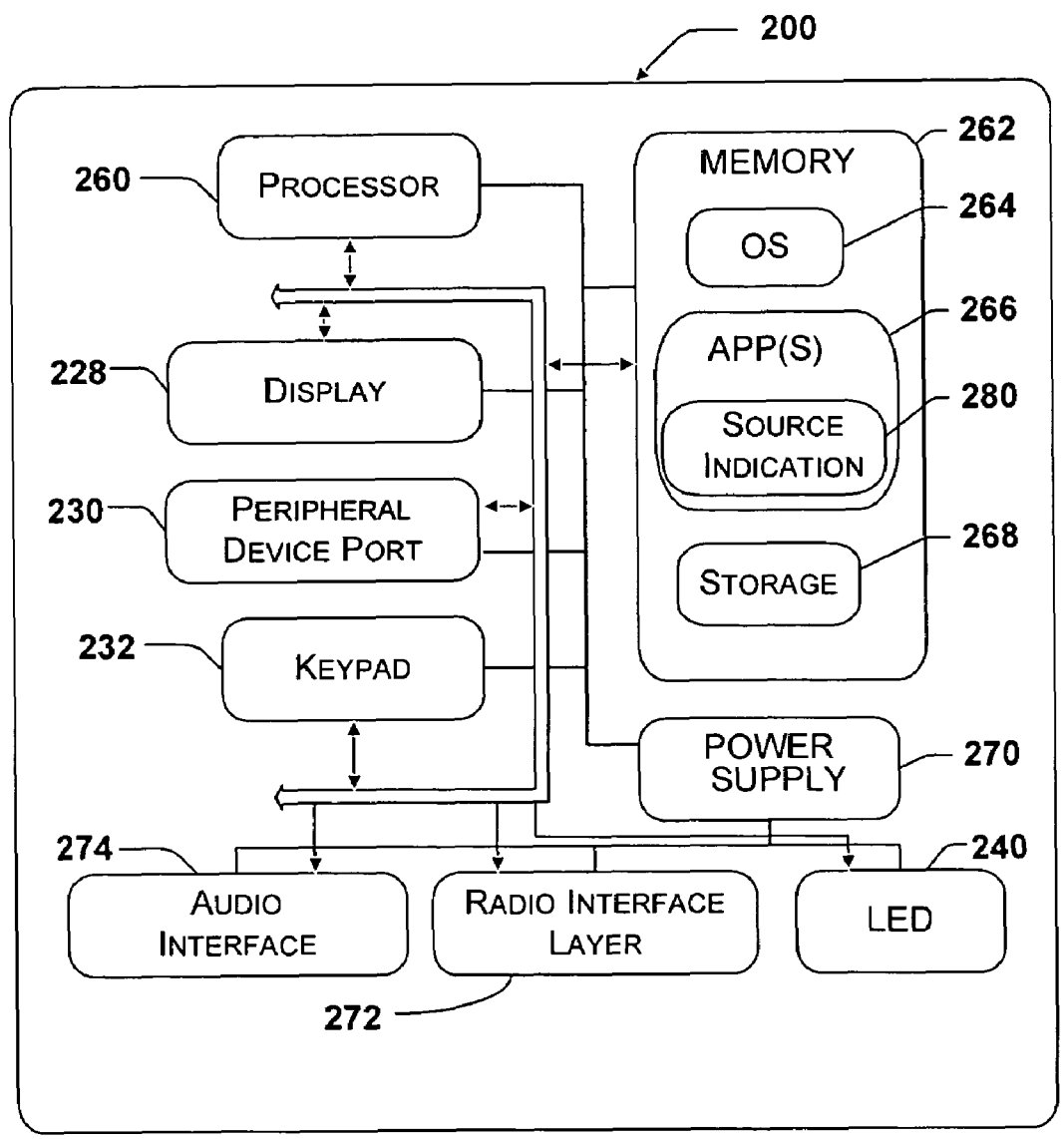
FIG. 2 illustrates an exemplary mobile device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

In one embodiment, applications 266 further include an application 280 for identifying the source of a communication and creating a signal instruction that correlates to a unique identifier of a communication source as is further discussed above in conjunction with FIGS. 3–9. The radio interface lay 272 may transmit a signal in accordance with the signal instruction.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for actuating an ancillary signal indicator upon reception of a signal from a communication source, comprising:
   imprinting the ancillary signal indicator with an imprint signal, wherein the imprint signal is a signal of a first mobile device that is separate from the ancillary signal indicator;
   transmitting an actuation signal from a second mobile device to the ancillary signal indicator, wherein the actuation signal is a signal transmitted from the second mobile device that is receiving a signal from the first mobile device; and
   actuating the ancillary signal indicator if the actuation signal corresponds to the imprint signal.

2. The computer-implemented method of claim 1, wherein imprinting the ancillary signal indicator further comprises imprinting the ancillary signal indicator with an imprint signal that corresponds to at least one user.

3. The computer-implemented method of claim 2, wherein the at least one user includes at least one member of a group comprising: a friend, a family member, an acquaintance, a social member, a business member and an emergency contact.

4. The computer-implemented method of claim 2, further comprising transmitting the imprint signal from a signal transmitter, wherein the signal transmitter is configured to transmit an imprint signal that identifies the at least one user.

5. The computer-implemented method of claim 4, wherein the user is identified from at least one member of a group comprising: a device indicator; a phone number; an email address; an SMS address; and a radio frequency identification tag.

6. The computer-implemented method of claim 2, further comprising transmitting the actuation signal from a signal transmitter, wherein the signal transmitter is configured to transmit an actuation signal that identifies a user.

7. The computer-implemented method of claim 6, wherein the user is identified from at least one member of a group comprising: a device indicator; a phone number; an email address; an SMS address; and a radio frequency identification tag.

8. The computer-implemented method of claim 1, wherein imprinting an ancillary signal indicator further comprises actuating an imprint actuator to instigate a signal imprint mode.

9. The computer-implemented method of claim 8, wherein the imprint actuator is at least one member of a group comprising: a mechanical actuator, an electrical actuator, and a magnetic actuator.

10. The computer-implemented method of claim 8, wherein the imprint actuator is a single-use actuator that prohibits overwriting of the imprint signal once the imprint signal has been imprinted on the ancillary signal indicator.

11. The computer-implemented method of claim 1, wherein imprinting an ancillary signal indicator further comprises prohibiting overwriting of the imprint signal once the imprint signal has been imprinted on the ancillary signal indicator.

12. An ancillary signal indicator for providing notification of the reception of a signal from a communication source, comprising:
   an imprint actuator configured to instigate a signal imprint mode;
   a receiver configured to receive an imprint signal from a first mobile device when in the signal imprint mode;
   a memory configured to store an imprint signal; and
   a signal notifier configured to actuate when a signal received from a second mobile device indicates that the second mobile device is receiving a communication from the first mobile device and the received signal matches the stored imprint signal.

13. The ancillary signal indicator of claim 12, wherein the imprint signal identifies at least one user.

14. The ancillary signal indicator of claim 12, wherein the imprint actuator is at least one member of a group comprising: a mechanical actuator, electrical actuator, or mechanical actuator.

15. The ancillary signal indicator of claim 12, wherein the imprint actuator is a single-use actuator that prohibits overwriting of the imprint signal once the imprint signal has been imprinted on the ancillary signal indicator.

16. The ancillary signal indicator of claim 12, further including a jewelry-shaped housing.

17. The ancillary signal indicator of claim 12 wherein the signal notifier is a visual, audio, vibratory or sensory notifier.

18. A computer-implemented method for actuating an ancillary signal indicator upon reception of a signal from a communication source, comprising:
   actuating an imprint actuator to instigate a signal imprint mode;
   imprinting the ancillary signal indicator with art imprint signal, wherein the imprint signal is a generated signal of a first cellular device;
   storing the imprint signal in a memory; and
   actuating a signal notifier on the ancillary signal indicator when the ancillary indicator is brought within range of a second cellular device and the second cellular device is receiving a signal from the first cellular device such that the ancillary signal indicator receives a signal from the second cellular device matching the stored imprint signal.

19. The computer-implemented method of claim 18, wherein the user includes at least one member of a group comprising: a friend, a family member, an acquaintance, a social member, a business member and an emergency contact.

20. A communication system for providing notification of the reception of a signal from a communication source, comprising:
   an imprint actuator having a breaker, wherein a one-time signal imprint mode occurrence is instigated when the breaker is actuated;
   a signal imprint memory for storing an imprint signal when the breaker is actuated and the communication system is brought within range of a first mobile device that transmits the imprint signal; and
   a notifier that actuates when an actuation signal is received from a second mobile device that is receiving a signal from the first mobile device, when the communication system is within range of the second mobile device, and when the actuation signal matches the imprint signal.

21. The communication system of claim 20, wherein the actuation signal includes at least one member of a group comprising: a device indicator, a phone number, an email address, an SMS address, and a radio frequency identification tag.

22. An ancillary signal indicator for prodding notification of the reception of a signal from a communication source, comprising:
   a means for instigating a signal imprint mode;
   a means for receiving an imprint signal from a first communication source;
   a means for storing the imprint signal; and
   a means for actuating a notifier when an actuation signal is received from a second communication source that is receiving a signal from the first communication source and said received actuation signal matches the stored imprint signal.

* * * * *